Patented Aug. 15, 1933

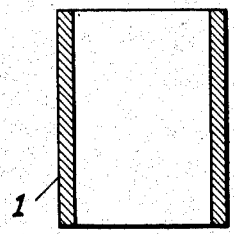
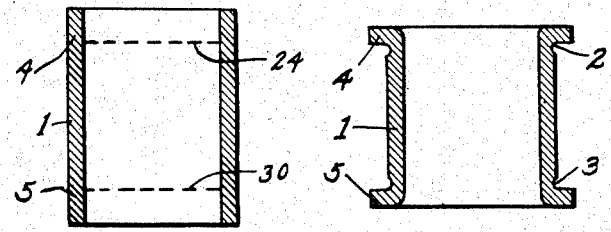
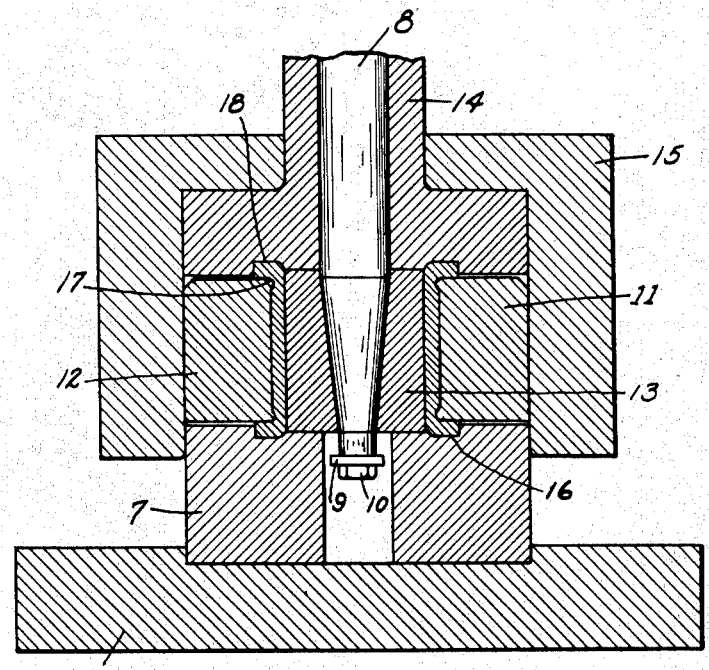

1,922,304

UNITED STATES PATENT OFFICE 1,922,304

BEARING MANUFACTURE

William H. Klocke, Woodhaven, N. Y., assignor to The Cleveland Graphite Bronze Company, Cleveland, Ohio, a Corporation of Ohio Application May 23, 1930. Serial No. 455,094

5 Claims. (Cl. 29—149.5)

The present invention, relating, as indicated, to bearing manufacture, is more particularly directed to an integral flanged bearing and a method of producing the same.

A further object of the invention is to provide a method of manufacturing a flanged bearing and finishing it by die pressing means without the necessity for any appreciable amount of machining or grinding. This results in a great saving in time and labor, and I have found that a bearing may be produced by my improved method which is sufficiently accurate to meet the usual commercial requirements.

Heretofore the production of flanged bearings has caused considerable difficulty because of the additional expense necessarily involved in providing the bearing with a flange. Further difficulties have been encountered in ruptures occurring along the bend of the flange and rough spots occur which must be thoroughly machined or ground. The last named step in the prior art, that of machining to the desired size, is one step which I have sought to dispense with, and I have found that by careful selection of the materials contained in the parts of my coin press, flanged bearings may be produced substantially free from imperfections and of most any desired dimensions.

To the accomplishment of the foregoing and related ends, said invention, then, consists of the means hereinafter fully described and particularly pointed out in the claims; the annexed drawing and the following description setting forth in detail one method and one product exemplifying my invention, such disclosed procedure and product constituting, however, but one of various applications of the principle of my invention.

In said annexed drawing:—

Fig. 1 is a vertical section of a bearing shell blank; Fig. 2 is a vertical section similar to Fig. 1 showing the lines along which the flanges are bent; Fig. 3 is a vertical section of the shell after the flanging and grooving operations; and Fig. 4 is a vertical section through the die parts.

The first operation is that of flanging the shell shown at 1, in Fig. 1, and this is done along the lines 24 and 30 shown in Fig. 2, the location of said lines depending, of course, upon the width of the flange which is desired.

The next step is to groove the outer surface of the shell at a point immediately adjacent the flange so that the under surface of the flange forms a continuation of the groove. The cutting of the grooves may be performed in any well known manner, or if cutting is objectionable to some classes of work, the grooves may be stamped in the shell by some such means as dies. The purpose of forming grooves in this manner is to allow for accurate machining or grinding, which is always a troublesome factor at a point where the adjacent surfaces are at right angles. The formation of the groove can be easily and quickly accomplished and the amount of labor expended is more than offset by the advantages derived.

After the shell has been flanged and grooved it has the appearance shown in Fig. 3 and it is now ready to have the final shape imparted to it. The next step therefore, is to place the bearing shown in Fig. 3 in the coin press of Fig. 4. The term "coin press" as understood in the art, refers to a die pressing mechanism in which an article is shaped to fine dimensions. The coin press proper comprises a base 6 upon which a circular die member 7, having a groove 16 therein, rests. This base of the die 7 is of one piece construction and is made of extremely strong material to withstand the pressures exerted from above. In the center of the die mechanism a plunger 8 is located which contacts with the split die 13. At the lower end of the plunger 8 a nut 10 is shown, and a half moon washer engages the space between the plunger shoulder and the nut 10 so that the split die 13 may be withdrawn when the die operation is completed. Surrounding the bearing, two external split dies 11 and 12 are shown, which have small projections 17 to fit in the grooves 2 and 3. Above the bearing a one piece circular die 14 is placed, which die is similar to 7 and has a groove 18 corresponding to groove 16. The die member 14 slides freely on the plunger 8. Surrounding the whole die there is a member 15 which slidably engages the member 14 so that any tendency to move the die parts outwardly is checked.

The method of producing my improved article is as follows:—The bearing shell blank is either cut from a tube or may be formed up from flat stock and has the appearance shown in Fig. 1. The blank is then bent along the lines 24 and 30 and a flanged bearing results, after which the grooves 2 and 3 are formed in the outer surface of the cylindrical shell, for the reasons hereinbefore mentioned. The flanged blank is now placed in the die mechanism shown in Fig. 4, that is, it is placed upon the base 7 and the split dies 13 are placed in contact with its inner vertical walls. The exterior split dies 11 and 12 are then brought around the exterior vertical walls, after which the upper die member 14 is moved downwardly along the plunger 8. The exterior clamp 15 is then moved down so that the parts are now held loosely together. The tapered plunger 8 is dropped into place, and due to the taper on the plunger and the tapering surfaces of the split die 13 a snug engagement is acquired. At this point the washer 9 may be slipped on, or this may be done after the die operation. The final step in the process is to exert a hammer like force on the plunger 8 and the upper die 14 which results in the bearing being formed to the most accurate measurements.

It will be seen from the above description that my bearing is a distinct improvement and that the process of producing it is simple and does not involve a great expenditure of either labor or material, and also that the bearing is very quickly produced. It will also be noted that one of the most troublesome problems in the art is easily solved, and that by employing my improved method and apparatus a flanged bearing may be produced at an extremely low cost, yet having a strength equal to that of those bearings of the prior art. A further result will be observed in that no machining or grinding is necessary to produce a bearing sufficiently accurate to meet ordinary commercial requirements.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In the manufacture of bearings, the steps which consist in bending the end portions of a bearing shell outwardly to form flanges, grooving the outer surface of the shell adjacent said flanges, and then coin pressing said shell.

2. In the manufacture of bearings, the steps which consist in flanging a cylindrical body, grooving the outer surface of said body so that the inner surface of said flange coincides with one wall of said groove, and then coin pressing said cylindrical body.

3. In the manufacture of bearings, the steps which consist in flanging a cylindrical body, grooving the outer surface of said body, exerting pressure outwardly on the vertical surfaces of said body and downwardly on the horizontal surfaces thereof to give the bearing its desired dimensions.

4. A cylindrical bearing having flanges on both ends and grooves adjacent said flanges, said flanges having been formed by forcing the end portions of said bearing outwardly, and said bearing having been accurately finished to the desired dimensions by coin pressing means.

5. In the manufacture of cylindrical bearings, the steps which consist in bending the end portions of a bearing shell outwardly to form flanges, forming two circular grooves in the outer surfaces of said bearing shell and near the ends thereof, then exerting pressure outwardly on the vertical surfaces and downwardly on the horizontal surfaces to give the bearing its desired dimensions.

WILLIAM H. KLOCKE.